April 5, 1966   J. LEVEY ETAL   3,244,780
DIFFERENTIAL HEATING AND DRAWING OF PLASTICS
Filed June 29, 1962   4 Sheets-Sheet 1
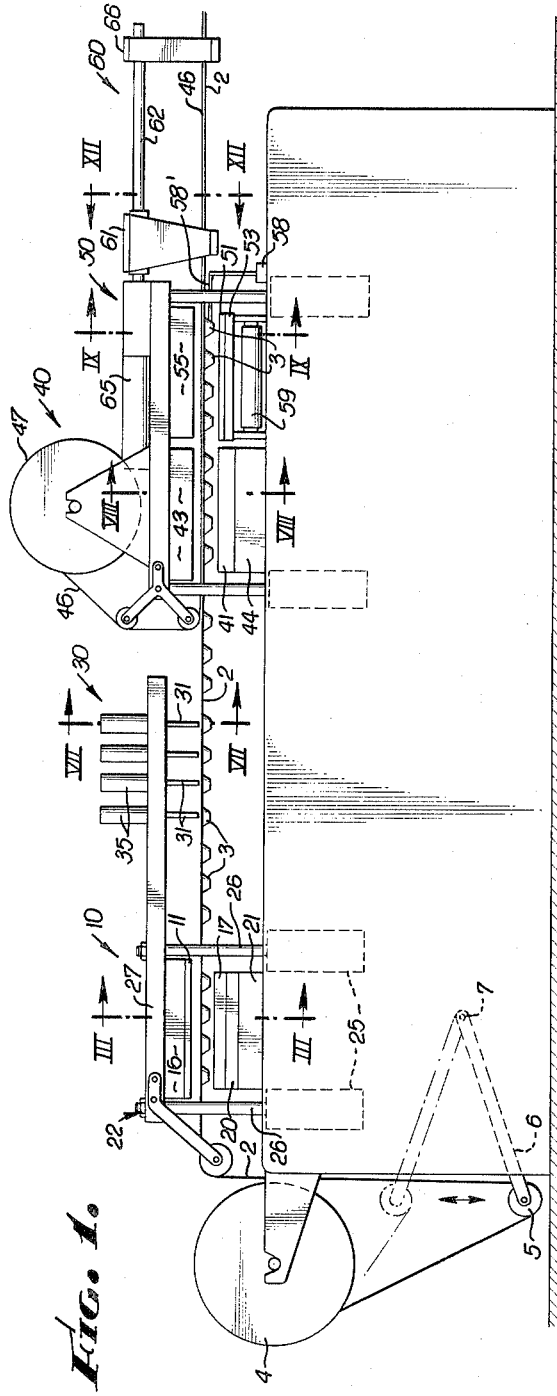
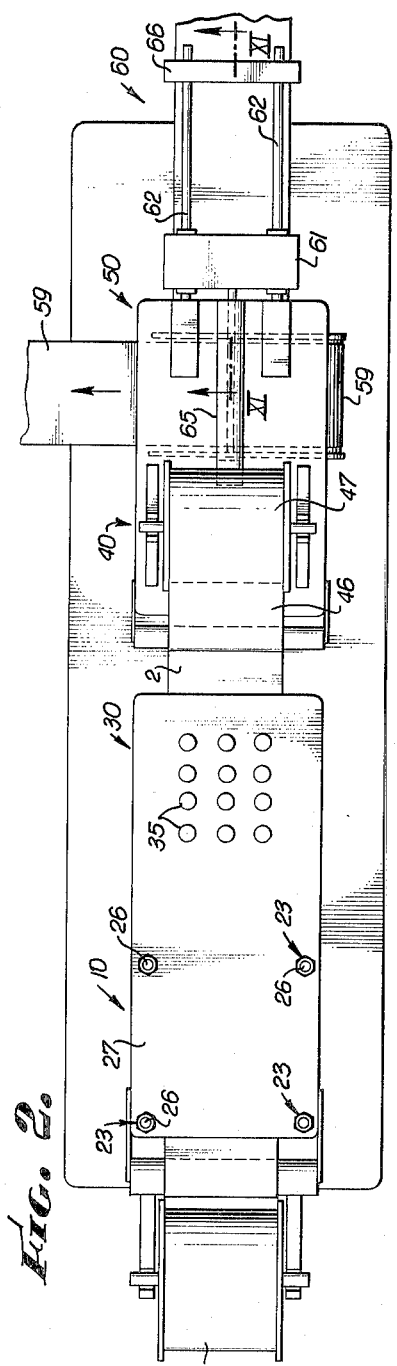
INVENTORS.
JOHN LEVEY
JOHN PYLANT
By *Albert M. Herzig*
ATTORNEY.

April 5, 1966 J. LEVEY ETAL 3,244,780
DIFFERENTIAL HEATING AND DRAWING OF PLASTICS
Filed June 29, 1962 4 Sheets-Sheet 2

INVENTORS.
JOHN LEVEY
JOHN PYLANT
By Albert M. Herzig
ATTORNEY.

April 5, 1966   J. LEVEY ETAL   3,244,780
DIFFERENTIAL HEATING AND DRAWING OF PLASTICS
Filed June 29, 1962
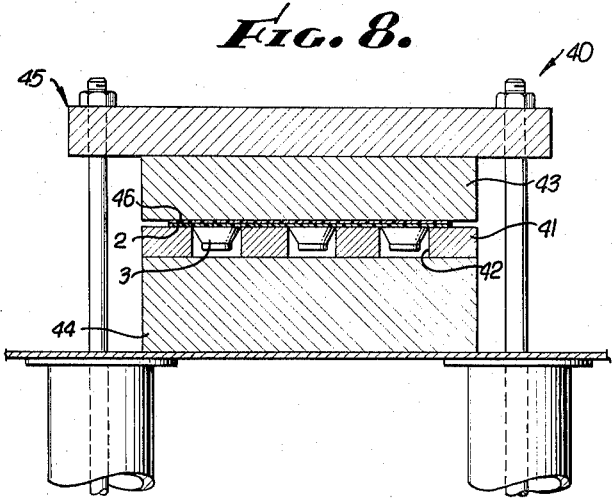
FIG. 8.
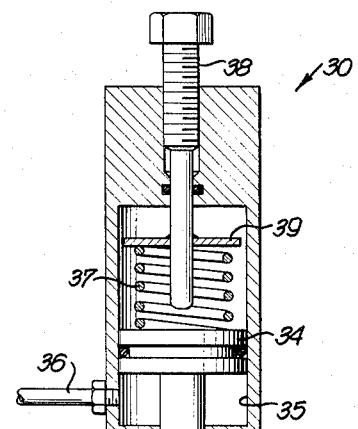
FIG. 7.
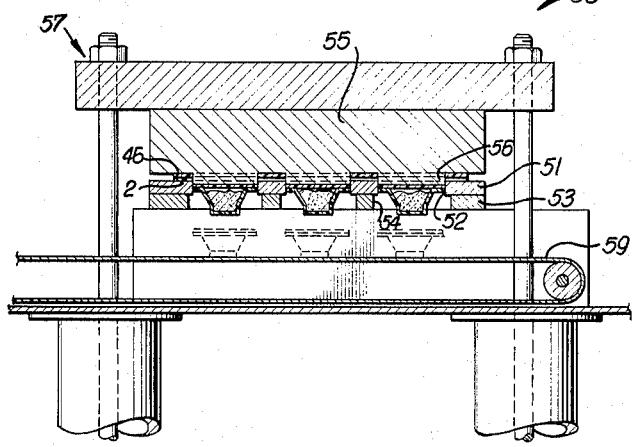
FIG. 9.
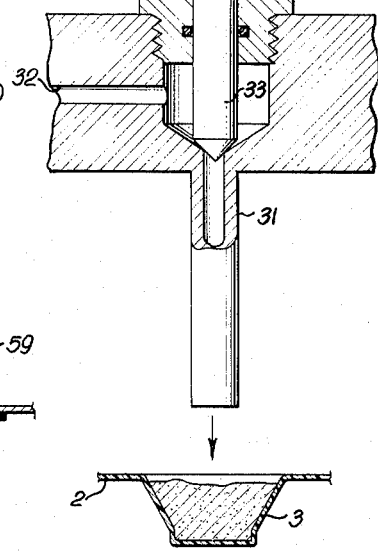
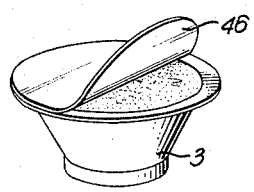
FIG. 10.
JOHN LEVEY
JOHN PYLANT
    INVENTORS.
BY *Albert M. Herzig*
ATTORNEY.

April 5, 1966    J. LEVEY ETAL    3,244,780
DIFFERENTIAL HEATING AND DRAWING OF PLASTICS
Filed June 29, 1962    4 Sheets-Sheet 4
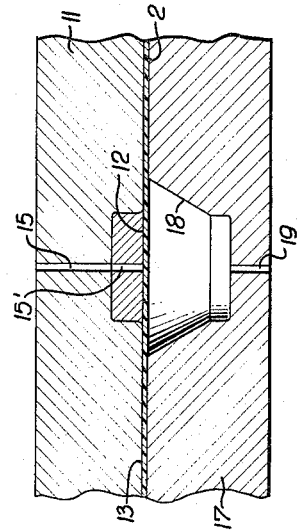
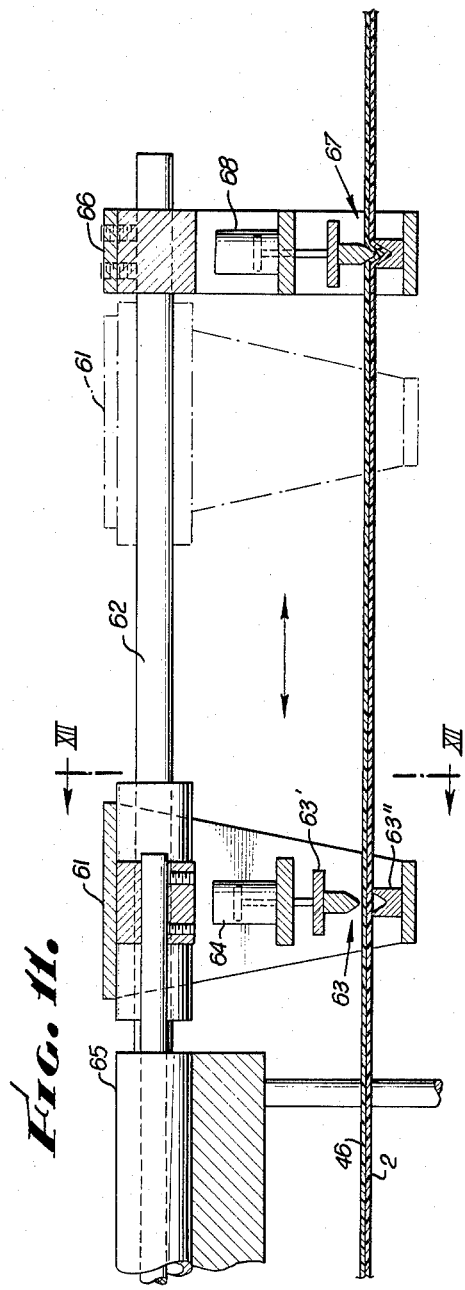
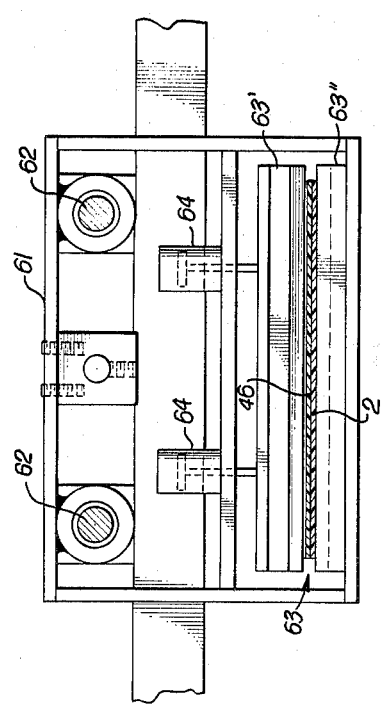
INVENTORS.
JOHN LEVEY
JOHN PYLANT
By Albert M. Herzig
ATTORNEY.

United States Patent Office 3,244,780
Patented Apr. 5, 1966

3,244,780
DIFFERENTIAL HEATING AND DRAWING
OF PLASTICS
John Levey, 4524 Beeman Ave., Studio City, Calif., and
John Pylant, 16317 Lassen St., Sepulveda, Calif.
Filed June 29, 1962, Ser. No. 206,267
2 Claims. (Cl. 264—89)

In general, the present invention involves methods and apparatus for pressure thermoforming hollow shaped parts from a sheet of thermoplastic material having walls of controlled thickness distribution. More particularly, the methods and apparatus of the present invention relate to heating and stretching a continuous sheet of thermoplastic material to form hollow containers therefrom wherein the heating and stretching are adapted to permit the controlled expansion of the sheet portion forming the walls of said hollow containers and subsequently filling, sealing, and separating said hollow containers.

The thermoforming of generally concave, hollow shaped parts, such as containers from sheets of thermoplastic material, usually employing a vacuum, is well known in the art of plastics fabrication and offers an economical and rapid method for fabricating plastic containers from sheets without the use of the high pressures and temperatures required for injection molding. The general procedure followed in vacuum thermoforming processes is to clamp a sheet of thermoplastic resin in a frame, soften it by heating (conveniently by means of radiant heat), remove the heat source, press the soft sheet tightly over the surface of a warm die having one or more hollowed out cavities in the shape of the desired article and then drawing the sheet down into the die surface by evacuation of the air trapped between the sheet and the die. The thermoplastic resin is then set in the shape of the die by cooling, which is accomplished by heat transfer, both to the warm die and to the atmosphere.

The process of thermoforming as described above has been relatively successful in forming shallow containers which have a depth-to-base diameter ratio of less than about ⅓. As is well known in the art, the term "base diameter" refers to the maximum linear dimension through the center of the base irrespective of the particular shape of the base. However, where it has been necessary to draw the thermoplastic sheet into deep cavities, particularly those in which the depth-to-base diameter ratio is greater than about ½, such prior art of vacuum thermoforming processes have been unsatisfactory. In such cases, the operation of the unmodified process of vacuum thermoforming results in articles with very thin bottoms and thin lower walls due to the greater stretching of the softened thermoplastic sheet in these areas. Consequently, the prior art has developed numerous processes generally designated as "plug-assist" thermoforming processes wherein a tapered, blunt-nosed plug is employed to push the sheet down into the die. However, such "plug-assist" thermoforming processes require much more complicated machinery and careful control to obtain the desired results. In addition, vacuum thermoforming has a number of other disadvantages. For example, the use of radiant heating slows down the process as a whole and requires that the heating and forming be formed in separate steps. Also, the use of a vacuum to form the container from the sheet greatly limits the available pressure differential which may be used during the forming operation.

Consequently, the objects of the present invention include methods and apparatus for the production of hollow shaped parts from a sheet of thermoplastic material having walls of controlled thickness distribution without requiring the complicated, expensive apparatus and methods of "plug-assist" thermoforming.

Another object of the present invention is a simple, fast method of pressure thermoforming a hollow container from a sheet of thermoplastic material without the limitations of the vacuum thermoforming process.

Still another object of the present invention is an inexpensive, simple apparatus for pressure thermoforming hollow containers from a sheet of thermoplastic material having a depth-to-base diameter ratio of greater than ½ and having walls of controlled thickness distribution.

Still another object of the present invention is a simple, inexpensive apparatus for the continuous production of hollow containers having walls of controlled thickness distribution from a continuous sheet of thermoplastic material.

Other objects and advantages of the present invention will be readily apparent from the following description and drawings which illustrate exemplary embodiments of the present invention.

In general, the present invention involves methods and apparatus for the production of hollow shaped parts having walls of controlled thickness distribution from a sheet of thermoplastic material. The method and apparatus are adapted to heat and stretch portions of said sheet to permit the controlled expansion of the sheet portion forming the walls of the hollow shaped parts. In order to facilitate understanding of the methods and apparatus of the present invention, reference will now be made to the appended drawings of the specific embodiments of the present invention. Such drawings should not be construed as limiting the invention which is properly set forth in the appended claims.

FIG. 1 is a side view of the complete apparatus for continuous production of hollow containers having walls of controlled thickness distribution from a continuous sheet of thermoplastic material.

FIG. 2 is a top view of the apparatus shown in FIG. 1.

FIG. 7 is an enlarged cross-sectional view of FIG. 1 taken along the lines of VII—VII of FIG. 1.

FIG. 8 is a cross-sectional view of FIG. 1 taken along the lines VIII—VIII of FIG. 1.

FIG. 9 is a cross-sectional view of FIG. 1 taken along the lines of IX—IX of FIG. 1.

FIG. 10 is a perspective view of a typical container produced by the apparatus shown in FIGS. 1–12.

FIG. 11 is a cross-sectional view of FIG. 2 taken along the lines of XI—XI of FIG. 2.

FIG. 12 is a sectional view of FIGS. 1 and 11 taken along the lines of XII—XII of FIGS. 1 and 11.

FIG. 13 is a sectional view similar to the views shown in FIGS. 4 and 5 of an alternative embodiment of an individual molding unit of the present invention.

Figure 3:
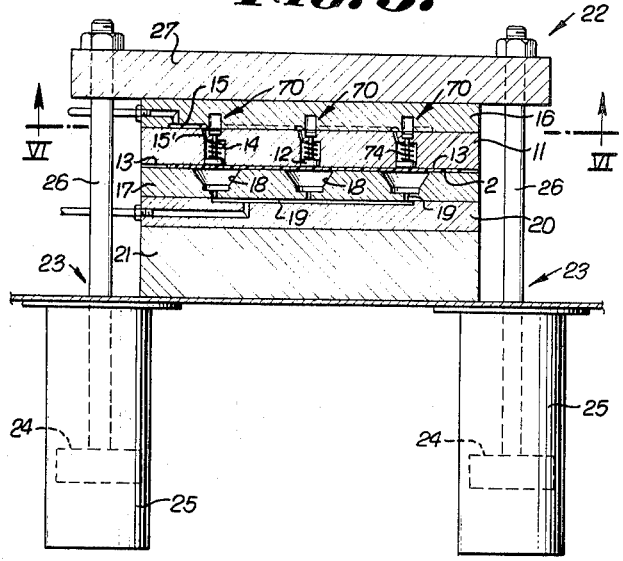
FIG. 3 is a cross-sectional view of the apparatus shown in FIG. 1 taken along the lines III—III of FIGS. 1 and 6.
Figure 4:
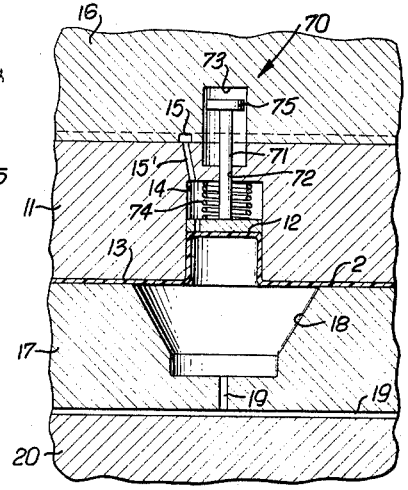
FIG. 4 is an enlarged view of a portion of FIG. 3 showing the molding unit for a single hollow container during the differential heating portion of the thermoforming method.
Figure 6:
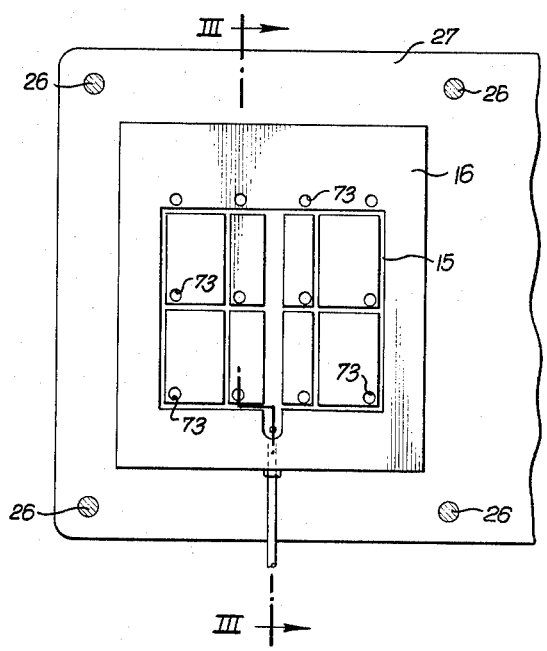
FIG. 6 is a cross-sectional view of FIG. 3 taken along the lines of VI—VI of FIG. 3.
Figure 5:
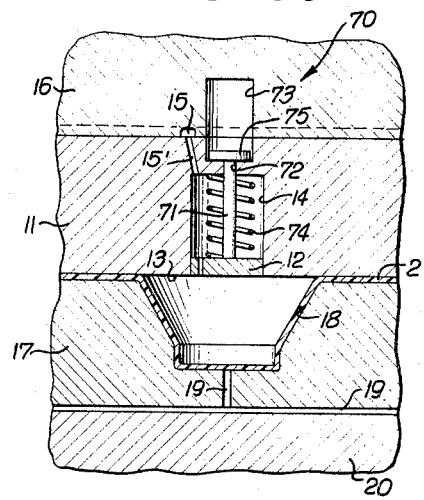
FIG. 5 is the same view as shown in FIG. 4 of the hollow container forming portion of the thermoforming method.

In FIGS. 1–12, the preferred embodiment of the present invention is illustrated showing the continuous production of hollow containers having walls of controlled thickness distribution from a continuous sheet of thermoplastic material. The apparatus shown in FIGS. 1–12, generally indicated as 1, includes a molding unit 10 adapted to heat and stretch portions of a thermoplastic sheet 2 to form hollow containers 3 therein. The hollow containers 3 formed in sheet 2 then pass through a filling unit 30 adapted to fill them with a predetermined amount of material. The filled containers then pass through a sealing unit 40 which is adapted to tightly cover them with a second sheet 46 of thermoplastic material. The sealed, filled containers then move to a punching unit 50 preferably adapted to separate such containers from the sheet of thermoplastic material. Finally, a transfer unit 60 is adapted to move the continuous sheet 2 of thermoplastic material at periodic intervals so that each sheet portion in which the hollow containers 3 are formed moves in sequence in operative association with said molding unit 10, filling unit 30, sealing unit 40, and punching unit 50.

Apparatus 1 is fed a continuous sheet 2 of thermoplastic material from a roll 4. Constant tension is maintained on sheet 2 at all times by means of weight 5 rotatably mounted on arm 6 which is in turn rotatably mounted on pivot 7. When transfer unit 60 moves sheet 2 forward, weight 5 initially moves upward to maintain constant tension on sheet 2. Then weight 5 descends to its lower position causing roll 4 to unwind.

The molding unit 10 of apparatus 1 includes a molding head platen 11 having surface portions 12 with substantially lower heat conductivity than the surrounding surface portions 13. For example, surface portion 12 may be made of disks of Teflon while the remaining portions of the molding head platen are made of conventional metal, such as steel. The surface portion 12 has a conduit 15' therethrough for communicating fluid pressure through conduit 15 in molding head platen 11 to the surface of the molding head platen 11. Molding head platen 11 also includes a heating means 16 for heating said head platen to a predetermined temperature. Disk 12 is preferably slidably mounted in a recess 14 in the molding head platen 11 and has an adjusting means 70 for positioning it in recess 14. Adjusting means 70 includes a rod 71 slidably mounted in an aperture 72 in molding head platen 11 and is received in hole 73 in heating means 16. A biasing spring 74 is positioned between disk 12 and the bottom of recess 14 to urge disk 12 toward the surface of molding head platen 11. A stop 75 mounted on rod 71 insures that disk 12 is maintained flush with the surrounding surface portion 13 of molding head platen 11 when disk 12 is subjected solely to the force exerted by biasing spring 74. A molding base platen 17 has a plurality of cavities 18 therein aligned with the surface portions 12 of molding head platen 11. The surfaces of the cavities 18 shape the expansion therein of the thermoplastic sheet 2 to form the hollow containers 3. The molding base platen 17 includes conduit means 19 for communicating fluid pressure to the cavities 18. Base platen 17 is supported by a cooling plate 20 and a base plate 21.

Operatively associated with the molding head platen 11 and molding base platen 17 are clamping means 22 for moving said platens into sealing relationship with the sheet 2 of thermoplastic material therebetween. Clamping means 22 includes four independent gripping means 23 located around the perimeter of the molding head and base platens 11 and 17, respectively. The gripping means 23 are adapted to clamp the edge portions of said platens together under the same pressure and thereby effectively compensate for deviations from the horizontal of the mating platen surfaces. Gripping means 23 are comprised of a piston 24 in a cylinder 25 which actuates a piston rod 26. Clamping means 22 also includes a head plate 27 which is attached to piston rods 26 and which rests upon the heating means 16. Operatively associated with the platen conduits 15 and 19 is a conventional pump means (not shown) for establishing fluid pressure in said recess and cavity.

The filling unit 30 adapted to fill the hollow containers 3 includes a plurality of ports 31, each port aligned with a corresponding hollow container 3. Ports 31 are fed by conduits 32 into which is admitted the fluid feed material under pressure. The flow from conduit 32 of feed materials to ports 31 is controlled by a valve 33. The position of valve 33 is in turn controlled by a piston 34 in a cylinder 35. Valve 33 is opened by fluid pressure through pipe 36 on the underside of piston 34 and it is closed by the compression of spring 37 on the upper side of piston 34. The force exerted by spring 37 on the upper side of piston 34 is regulated by a threaded screw 38 with a spring support 39 mounted thereon. Initially, the opening of valves 33 is determined for all ports 31 by the fluid pressure in line 36. However, because of the individual variations in position and pressure drop for each of the ports 31, the threaded screw 38 permits the flow to each of the ports to be controlled individually.

The sealing unit 40 is adapted to tightly cover the filled containers 3 with a second sheet of plastic material, such as "Mylar." Sealing unit 40 includes a sealing base platen 41 having cavities 42 therein for receiving each of the filled containers 3 and a sealing head platen 43 mounted above the sealing base platen 41. Sealing base platen 41 rests upon a base plate 44. Sealing base platen 41 and sealing head platen 43 are brought together in sealing relationship by sealing clamping means 45 having the same construction as molding clamping means 22. A second sheet 46 of thermoplastic material is unrolled from a roll 47 and covers the top surface of sheet 2 when the sealing base platen 41 and the sealing head platen 43 are flattened together in sealing relation. While in such sealing relation, heat is applied through the sealing head platen 3 in the conventional manner so that the second thermoplastic sheet 46 forms a tight cover over the filled containers 3.

As illustrated, the punching unit 50 is adapted to separate the sealed, filled containers 3 from the continuous sheet 2 of thermoplastic material. The punching unit 50 includes a base die 51 having apertures 52 therein aligned with each of the sealed, filled containers 3. Base die 51 is supported by a base support plate 53 having molds 54 therein which are aligned with the apertures 52 in base die 51. Mounted above base die 51 is a head die 55 having die cutters 56 mounted thereon aligned with the aperture 52 is base die 51. Head die 55 is mounted by clamping means 57 which is the same as clamping means 22. Proper alignment of sealed, filled containers 3 in punching unit 50 is insured by a switching means 58 whose contact arm 58' is actuated by one of the lead containers 3 of a given set of containers 3. When arm 58' is actuated it rotates away from punching unit 50 and stops the transfer unit 60. The next movement of the transfer unit 60 then rotates contact arm 58' back into position for the next set of sealed, filled containers 3. When the head die 55 and base die 51 are moved together by clamping means 57, the sealed, filled containers 3 are punched out and dropped onto a conveyor 59 for subsequent handling operations.

Transfer unit 60 is adapted to move the continuous sheets 2 and 46 at periodic intervals so that the sheet portions in which the hollow containers 3 are formed and which seal the filled containers are moved in sequence in operative association with the molding unit, filling unit, sealing unit, and punching unit. Transfer unit 60 includes a movable clasping unit 61 which is slidably mounted on parallel bars 62 and is moved by piston and cylinder 65 between a position adjacent to punching unit 50 and a position adjacent to stationary clasping means 66 as shown in FIG. 12. Movable clasping unit 61 includes a vise 63 actuated by piston and cylinders 64 which move the upper vise arm 63′ into and out of gripping position with respect to lower vise arm 63″. Transfer unit 60 also includes a stationary clasping means 66 having a vise 67 actuated by piston and cylinders 68 in the same fashion as in the sliding clamping means 61. When the moving clamping means 61 moves toward the stationary clamping means 66, its vise 63 is closed to tightly grip the continuous sheets 2 and 46 while the corresponding vise 67 in the stationary clasping means 66 is open to permit the continuous sheets 2 and 46 to pass freely therebetween. When the clasping means 61 reaches a position adjacent to the stationary clasping means 66 its vise 63 then opens while the vise 67 of stationary clasping means 66 is closed. Movable clasping means 61 then returns to its initial position with its vise 63 open so that the continuous sheets 2 and 46 may slide freely therebetween. During such movement of clasping means 61, the continuous sheets 2 and 46 are maintained in stationary position by the closed vise 67 of stationary clasping means 66.

Conventional control means are operatively associated with the apparatus and its molding unit, filling unit, sealing unit, punching unit, and transfer unit to operate the apparatus and each of said units in proper sequence with respect to each successive sheet portion. A variety of well-known control systems may be used with said apparatus and its units and such systems are not part of the present invention. However, the essential features of their construction will be obvious to one skilled in the art in view of the following discussion of the operation of apparatus 1.

In the operation of apparatus 1, the transfer unit 60 moves a new portion of continuous sheet 2 into position in molding unit 10 while molding head platen 11 is in its raised position. Clamping means 22 then moves the head and base platens together in sealing relationship by introducing fluid, i.e. gas or liquid, above and exhausting it below pistons 24 in cylinders 25. After head platen 11 has been clamped sufficiently tight against base platen 13 to prevent leakage therebetween, air is then introduced under pressure into conduit 19 and exhausted through conduit 15. Preferably, the flow of fluid in each of the the individual cavities 18 in the base platen 17 is controlled by individual flow orifices whose opening may be regulated by a valve; however, all cavities 18 may be fed through a single conduit 19 as shown in FIG. 3. Fluid pressure in cavity 18 may thus be built up at a controlled rate and maintained for a predetermined time period. For example, when molding a polystyrene sheet of about 0.01 inch thickness and using a heater temperature of about 300° F., pressure may be built up to about 40 p.s.i.g. in about two to four seconds. As air pressure is exerted on the thermoplastic sheet 2, disk 12 is forced into recess 14 of the molding head platen 11 proportionally to the fluid pressure. Consequently, the thermoplastic sheet is stretched to form a hollow nodule therein which is received by the recess formed in the molding head platen 11. Preferably, the molding head platen 11 is maintained at a uniform predetermined temperature by heater 16 throughout the operation of apparatus 1. Portions of sheet 2 adjacent to disk 12 are heated to a temperature substantially lower than the surrounding sheet portion, since disks 12 offer more resistance to the flow of heat therethrough and the heating occurs for only a predetermined time period which is shorter than that required to bring such sheet portions up to forming temperature. The surrounding sheet portions are heated to a substantially uniform temperature by the molding head platen 11 at which the thermoplastic material is easily formed. During such heating under pressure the adjoining edge portions surrounding the disk sheet portions are stretched inwardly to aid in forming said hollow nodules having tops formed by the recessed disks 12.

Fluid pressure is then introduced through conduit 15 and exhausted from cavities 18 through conduit 19. Such reversal of fluid pressure reverses the hollow nodule to form a hollow container in cavity 18 with the inner walls of the hollow nodules forming the outer walls of such container. Initially, during this process, the central portion of the container, i.e. its bottom wall and lower side walls, resists stretching more strongly than the portion of the side walls adjacent to its rim because the central portion is not as hot as such rim portion. Thus the hot rim portions of the container will stretch first, but they then contact the walls of the cavities 18 first and become cooled thereby so that further stretching is prevented. Thus subsequent stretching of the container is confined to the heated central portion that has not as yet touched the surfaces of cavities 18. In this way the bottom wall and lower side walls of the container 3 are stretched to form a container having walls of controlled thickness distribution.

Fluid pressure is then exhausted through conduit 15 and the head platen 11 is raised by clamping means 22. Transfer means 60 then moves the hollow containers 3 to the filling unit 30. The hollow containers 3 are then filled by the filling unit 30 while a second set of containers 3 is formed by molding unit 10. The filled containers 3 are then moved by transfer unit 60 to the sealing unit 40 where they are sealed while the second set of containers is filled by unit 30 and a third set of containers is formed by molding unit 10. The sealed, filled containers 3 are then separated by punching unit 50 while the second set of containers is sealed by sealing unit 40, the third set of containers is filled by filling unit 30, and a fourth set of containers is formed by molding unit 10.

In FIG. 13, another embodiment of the present invention is illustrated. In FIG. 13, the molding head platen has a surface portion formed by a stationary disk 12 inset therein and disk 12 has a conduit 15′ therethrough for communicating fluid pressure to the surface of the molding head platen 11. The embodiment shown in FIG. 13 operates in substantially the same fashion as does the embodiment shown in FIGS. 1–12 except that the surrounding side portions are not initially stretched inwardly before the container is formed. Preferably, the disk is heated to a substantially uniform temperature. However, by properly adjusting its configuration, the temperature in disk 12 may decrease proportionally to the distance from its edges.

In the method and apparatus of the present invention, it should be noted that the rim of the container, i.e. the base of the initially formed hollow nodule, is preferably circular, although it may be of any shape, such as a square, a rectangle, and etc. In the preferred embodiment of the apparatus of the present invention, the area of the low conductivity surface portion is preferably smaller than the mouth of the cavity in the molding base platen to insure that the upper rim portion of the container is sufficiently heated.

It should be noted that many thermoplastic materials may be used in the process of the present invention, including such common ones as polystyrene and acrylic resins. In the case of the polystyrene resins, it should be noted that the biaxial stretching of the present invention improves the flexibility in toughness of the resulting container walls.

As set forth in the illustrated specific embodiment, the apparatus of the present invention includes a molding unit, filling unit, sealing unit, punching unit, and transfer unit operatively connected into a single integral structure. Initially, it should be noted that such structure may be enclosed in a hood so that the entire operation is conducted under an inert atmosphere, such as nitrogen. Such handling permits the packaging of foods so that they will retain their freshness in the resulting sealed containers for substantially longer periods of time. However, the molding unit of the present invention is adapted to be utilized in many other combinations. Thus the filling unit, sealing unit and punching unit may each be adapted to be physically removed from the apparatus or to be rendered inoperative. In such apparatus, the second system would be designed so that the molding unit forms the master control section with each of the other units being connected thereto by jacks and plugs. With such variation of the present invention, for example, the molding unit could be used solely with the punching unit to form empty containers. It should also be noted that other types of filling, sealing, punching, and transfer units may be utilized in connection with the molding unit of the present invention. For example, the filling unit may be one which is adapted to fill the containers with nuts and bolts or cereal, rather than a fluid mixture, such as cottage cheese. Also, the sealing unit may be adapted to fit individual covers on the containers by feeding them from a magazine and putting them in place with a plunger mechanism. In addition, while the whole apparatus may utilize a continuous sheet, if desired, separate sheets may also be used for each set of containers. Also, any shaped part may be formed from a sheet of material in addition to containers, such as hollow concave or convex shapes.

If desired, the molding base platen of the present invention may be split to include an upper and lower plate as described in our copending application entitled "Selective Heating and Drawing of Plastics" being filed concurrently herewith. Thus the side walls of the container may be formed by the upper plate while the bottom wall is formed by the bottom plate. Such variation permits the mold to be made more simply, particularly where unusual bottom wall configurations are desired, e.g. the bottom may be convex upwardly with a trade insignia formed on it. Also, such feature facilitates the forming of the conduits for communicating fluid pressure to the cavity in the base platen, since they may be merely grooves or a single, wide, shallow recess in the upper surface of the bottom plate.

There are many features in the present invention which clearly show the significant advances the present invention represents over the prior art. Consequently, only a few of the more outstanding features will be pointed out to illustrate the unexpected and unusual results attained by the present invention. One of the features of the present invention is the preforming of a hollow nodule prior to the forming of the hollow container to be produced wherein the sheet portions surrounding the nodule are expanded inwardly to form a portion of the side walls of such nodules adjacent to its base. Also, the side walls and top of such hollow nodule are heated and stretched in such a fashion so that the upper rim portions of the resulting container are first initially formed and then the bottom and side portions joining the bottoms are subsequently formed with a controlled amount of stretching in each case. Thus, for example, the rim portions of the resulting container are heated to a predetermined temperature while the remaining portions of the container are heated to a lower temperature with the lower temperatures being inversely proportional to the distance from the rim of said resulting container toward the bottom of the container.

Another feature of the present invention is the utilization of a portion of the molding head platen having a lower heat conductivity to regulate the temperature to which the adjoining portion of the sheet is raised. Thus in a simple, rapid fashion, the methods and apparatus of the present invention achieve a hollow container having walls of controlled thickness distribution.

Another feature of the present invention is the utilization of fluid pressure to form the hollow containers and to heat the sheet being molded by contact with the heating surface. This feature permits such higher pressure differentials for rapid forming of the hollow containers and achieves more economical and rapid heating of the sheet of thermoplastic material. In addition, pressure heating and forming as illustrated can be done in a single operation which eliminates an additional step in the usual plastics forming process and apparatus. However, probably most important is the versatility of such feature, since molding can be done with equal facility with male or female molds and the heater may be either above or below the sheet of plastic being formed. In the case of vacuum thermoforming, it is necessary that the heater be located above the sheet, since as the sheet is heated it sags and would contact the heater. An example of the versatility afforded by this feature would be the use of male molds, rather than the female molds illustrated in the drawings to form the containers of the present invention. In such case, the male mold should project downwardly so that the containers being formed are upright and ready to be filled in the succeeding filling unit. When the base platen containing the male mold projects downwardly, the head platen containing the heater must be below it and the sheet is then forced upward to form the containers after the initial heating period.

Another feature of the present invention is the utilization of the independent gripping means around the perimeter of not only the molding unit but also the sealing and punching units. For example, in the case of the molding unit, such independent gripping means around the perimeter of the molding head and base platens insures a uniform pressure around the edges when the platen surfaces are not initially parallel. Thus leakage is prevented without the necessity of excessive clamping pressures. In addition, if one of the platens is placed at an angle to the base of the molding unit for special molding operations, then the other platen will automatically adapt to the change to give a uniform seal.

Still another feature of the present invention is the utilization of a plurality of filling units utilizing a single pressure to give the fluid feed material combined with regulating means for individually controlling the flow of feed material to each container.

Another feature of the present invention is a switching means in the punching unit which compensates for the stretching of a sheet as a whole during the passage of the containers through each of the units of the present invention. Such switching means insures the proper alignment of the containers when the final cutting operation is performed.

It will be understood that the foregoing description and drawings are only illustrative of the present invention and it is not intended that the invention be limited thereto. Many other specific embodiments of the present invention will be obvious to one skilled in the art in view of this disclosure. All substitutions, alterations, and modifications of the present invention which come within the scope of the following claims or to which the present invention is readily susceptible without departing from the spirit and scope of this disclosure are considered part of the present invention.

We claim:
1. A method of forming a hot ductile sheet of thermoplastic material into a three-dimensional sheet comprising the steps of:
    placing an area of the material adjacent to the mouth of a cavity mold;
    forming the material away from the mouth of the cavity mold by a pressure differential including forcing the central portion of the said area of material against a yieldable member to form a hollow nodule therein;
    heating the said area of the material and heating the said central portion of the area to a lesser degree; and changing the pressure differential in order to form the area of material into the cavity mold whereby the hot peripheral portions of the area will stretch first and become cooled by the walls of the cavity mold, whereby the bottom and lower side walls of the container formed are stretched, to provide walls of controlled thickness distribution.

2. A method as in claim 1 wherein said yieldable member is mounted in an expansible chamber into which said central portion is forced.

References Cited by the Examiner

UNITED STATES PATENTS

| | | | |
|---|---|---|---|
| 2,230,189 | 1/1941 | Ferngren | 18—19 |
| 2,377,946 | 6/1945 | Leary | 264—327 |
| 2,670,501 | 3/1954 | Michiels | 18—56 |
| 2,702,411 | 2/1955 | Winstead | 18—19 XR |
| 2,736,065 | 2/1956 | Wilcox. | |
| 2,749,572 | 6/1956 | Nowak | 264—327 XR |
| 2,917,783 | 12/1959 | Olson et al. | |
| 2,949,713 | 8/1960 | Vogt | 53—29 |
| 2,967,328 | 1/1961 | Shelby et al. | 18—19 |
| 2,970,414 | 2/1961 | Rohdin | 53—29 |

FOREIGN PATENTS 741,040   11/1955   Great Britain.

ROBERT F. WHITE, *Primary Examiner.*

MORRIS LIEBMAN, ALEXANDER H. BRODMERKEL, *Examiners.*